UNITED STATES PATENT OFFICE 3,365,483
Patented Jan. 23, 1968

3,365,483
PROCESS FOR OBTAINING DIETHYL-
AMINOETHANOL ACETYLSALICYLATE
HYDROCHLORIDE
Zofia Jerzmanowska, Lodz, and Walentyna Bryk and Andrzej Rudnicki, Starogard-Gdanski, Poland, assignors to Starogardzkie Zaklady Farmaceutyczne "Polfa," Starogard-Gdanski, Poland
No Drawing. Filed June 5, 1963, Ser. No. 285,600
2 Claims. (Cl. 260—474)

Acetylsalicyclic acid is a relatively unstable compound and a direct preparation of its esters, especially high-purity ones, entails great difficulties.

A published method of preparation of diethylaminoethanol acetylsalicylate hydrochloride (cf. Z. Jerzmanowska and Z. Orchowicz, Acta Polon. Pharm., 13, 11–25 (1959)) involves the conversion of acetylsalicylic acid into chloride by the action of phosphorus pentachloride in a petroleum hydrocarbon fraction as medium and a subsequent esterification of the chloride with diethylaminoethanol in benzene followed by crystallization from absolute ethanol. On a commercial scale the process proved to be inconvenient, however.

It has been found that, according to the present invention, diethylaminoethanol acetylsalicylate hydrochloride is conveniently prepared by transesterification of readily accessible salicylic acid esters with diethylaminoethanol, acetylation with acetic anhydride and a subsequent conversion of the resulting diethylaminoethanol acetylsalicylate into hydrochloride in absolute ethanol saturated with hydrogen chloride.

According to the invention, the transesterification, e.g. of phenyl salicylate with diethylaminoethanol, is easily performed at 40–50° C. and atmospheric pressure and gives a 90–95 percent yield of product; instead, aliphatic salicylates, which have been found to react under conventional conditions only with difficulty and with a low, about 12–14 percent yield of product, are transesterified, according to the invention, under strictly determined conditions involving reduced pressure and simultaneous distillation of the resulting alcohol, to give an 85–90 percent yield of product.

The diethylaminoethanol salicylate, obtained by transesterification, is acetylated either directly or after a vacuum distillation, with acetic anhydride at a temperature lower than 55° C., most conveniently at 40–50° C. The resulting diethylaminoethanol acetylsalicylate is distilled at a reduced pressure, and the hydrochloride is precipitated with a dry ethanolic hydrogen chloride solution added in 5–25 percent excess. The hydrochloride is used as a local anesthetic.

Example I. — Diethylaminoethanol, 130 wt. parts, is mixed with 214 wt. parts of phenyl salicylate for 3 hrs. at 40° C. and for another 2 hrs. at 50–60° C. The excess of diethylaminoethanol and the resulting phenol are distilled out under reduced pressure and, finally, diethylaminoethanol salicylate is collected at 148–152° C. and 15 mm. Hg. The yield is 210–220 wt. parts. Acetic anhydride, 105 wt. parts, and, optionally, several drops of concentrated sulphuric acid, are added to 200 wt. parts of the salicylate and the mixture is heated for 2 hrs. at 50° C. Then the mixture is distilled at 15 mm. Hg and the actual cut of pure diethylaminoethanol acetylsalicylate is collected at 170–178° C. The yield is 205–210 wt. parts. A 10 percent hydrogen chloride solution in absolute ethanol, 300 wt. parts, is added to 205 wt. parts of the ester with vigorous stirring and cooling intense enough to keep the temperature below 20° C.; then the mixture is cooled to −10° C., the precipitating diethylaminoethanol acetylsalicylate hydrochloride is filtered off and washed with cold absolute ethanol. The yield of dry product is 200 wt. parts. The product may be recrystallized from 250 wt. parts of absolute ethanol. The yield of the first crop is 180 wt. parts of dry crystals, M.P. 134–136° C.

Example II.—Diethylaminoethanol, 146 wt. parts, is heated for 3 hrs. with 152 wt. parts of methyl salicylate at 70–75° C. and 100–200 mm. Hg and then the temperature is raised gradually to 90° C. and the pressure reduced to 30 mm. Hg. The whole operation takes 15 hrs. Then the excess of diethylaminoethanol is distilled out at 15 mm. Hg and the actual fraction of diethylaminoethanol salicylate is collected at 148–152° C., 200 wt. parts, and processed further as in Example I.

We claim:
1. A method of preparing diethylaminoethanol acetylsalicylate hydrochloride comprising reacting phenyl salicylate with diethylaminoethanol at a temperature of from 40 to 50° C. to transesterify the phenyl salicylate, acetylating the transesterified phenyl salicylate by reacting it with acetic anhydride at a temperature of from 40 to 50° C. to form diethylaminoethanol acetylsalicylate, and reacting the diethylaminoethanol acetylsalicylate with hydrogen chloride to form diethylaminoethanol acetylsalicylate hydrochloride.

2. A method of preparing diethylaminoethanol acetylsalicylate hydrochloride comprising reacting methyl salicylate with diethylaminoethanol at a reduced pressure to transesterify the methyl salicylate while distilling off methanol, which is a by-product of the transesterification, acetylating the transesterified methyl salicylate by reacting it with acetic anhydride at a temperature of from 40 to 50° C. to form diethylaminoethanol acetylsalicylate, and reacting the diethylaminoethanol acetylsalicylate with hydrogen chloride to form diethylaminoethanol acetylsalicylate hydrochloride.

References Cited
UNITED STATES PATENTS

| | | | |
|---|---|---|---|
| 2,248,112 | 7/1941 | Neustein | 260—474 |
| 2,489,950 | 11/1949 | Blicke | 260—477 X |
| 2,584,160 | 2/1952 | Sahyun | 260—474 |
| 2,673,853 | 3/1954 | Rorig | 260—477 X |
| 3,141,012 | 7/1964 | O'Boyle | 260—474 X |

FOREIGN PATENTS 14,699   1902   Great Britain.

OTHER REFERENCES

Hickinbottom: "Reactions of Organic Compounds" (London, 1948), pp. 266–267.

LORRAINE A. WEINBERGER, *Primary Examiner.*

R. K. JACKSON, *Examiner.*

S. B. WILLIAMS, *Assistant Examiner.*